W. J. STAHR.
CAR BRAKE.
APPLICATION FILED APR. 1, 1909.
940,373.
Patented Nov. 16, 1909.
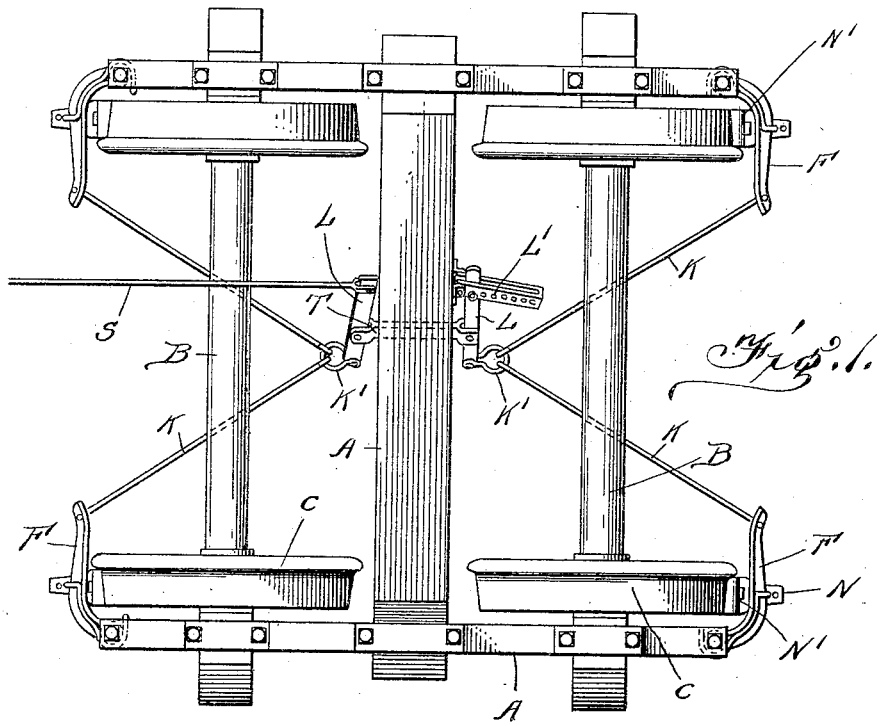
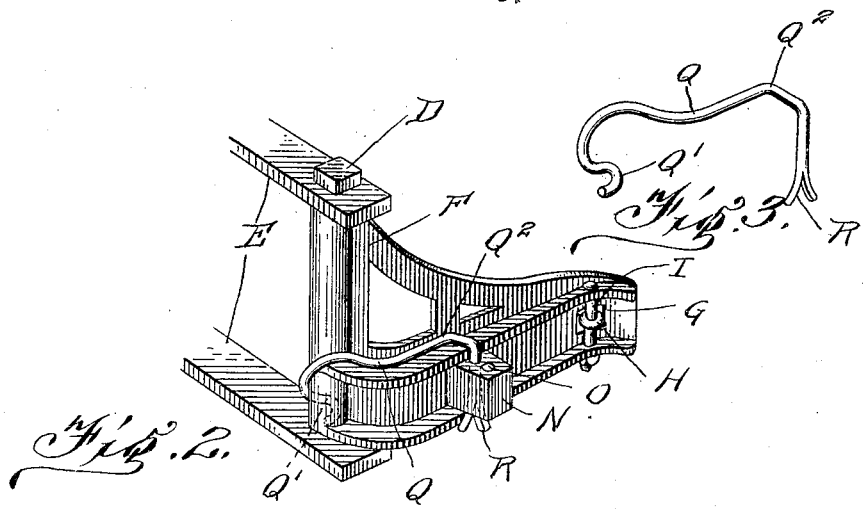

UNITED STATES PATENT OFFICE.

WILLIAM J. STAHR, OF NESCOPECK, PENNSYLVANIA.

CAR-BRAKE.

940,373.

Specification of Letters Patent.   Patented Nov. 16, 1909.

Application filed April 1, 1909.   Serial No. 487,296.

*To all whom it may concern:*

Be it known that I, WILLIAM J. STAHR, a citizen of the United States, residing at Nescopeck, in the county of Luzerne and State of Pennsylvania, have invented certain new and useful Improvements in Car-Brakes; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in car brakes and comprises various details of construction and combinations and arrangements of parts which will be hereinafter fully described and then specifically defined in the appended claims.

I illustrate my invention in the accompanying drawings, in which:

Figure 1 is a top plan view of a truck showing the application of my invention thereto. Fig. 2 is an enlarged detail perspective view, and Fig. 3 is a detail view of a spring which acts as a key.

Reference now being had to the details of the drawings by letter, A designates the frame of the truck in which are journaled the axles B to which the wheels C are fixed. Pivotally mounted upon a bolt D passing through the two opposite parallel beams E of the truck is a swinging bracket member F, preferably curved as shown, said member being apertured at G for the reception of the eye H which is engaged by the pin I. Said eye H is formed at the outer end of the rod K which fastens to the ring K' upon the lever L which in turn is adjustably connected to the swinging rack L', shown in Fig. 1 of the drawings. Positioned adjacent to each of the wheels is one of said swinging members F and each of the latter is apertured to receive the shank portion N of a brake shoe N', said shank portion having apertures O therein provided for adjustment of the brake shoe incident to wear thereon. A spring Q has one end bent to form a hook Q' which engages over one of the bars E and thence turns about the hollow shank portion of the member F through which the bolt D passes and said spring is bent at an angle at $Q^2$ forwardly and thence downwardly and is formed with a split end R, shown clearly in Figs. 2 and 3 of the drawings. Said split end of the spring is adapted to be passed through one or another of the apertures O in the shank portion of the brake shoe and serve as a key while the resiliency of the spring serves also to hold the shoe at its farthest backward throw snugly against the inner face of the member F and at the same time causes said member to be thrown normally away from the tread surface of the wheels. Upon reference to Fig. 1 of the drawings, it will be seen that each of the members F has a rod K connected thereto, each of which is connected to a ring K' and a link T connects the two levers L and a rod S is connected to one of the levers L and provides means for applying the brake.

From the foregoing, it will be noted that by the provision of a brake apparatus as shown and described a simple and efficient means is afforded whereby all of the brakes for the wheels of a truck may be normally held from the tread surfaces of the wheels and the spring which serves to hold the brakes from the wheels serves also as a key to hold the brake shown upon the swinging member, thus performing a double function.

What I claim to be new is:—

1. In combination with a truck, wheels mounted therein, swinging brake shoe carrying members mounted upon the truck, shoes carried by said members, springs mounted upon the truck and adapted to normally hold the shoes upon the members and said members from normal contact with the wheels, as set forth.

2. In combination with a truck, wheels mounted therein, swinging brake shoe carrying members mounted upon the truck, a brake shoe having an apertured shank portion extending through an opening in said member, a spring fastened to the truck and passing about the pivotal point of said swinging member and engaging one of the apertures in said shank portion of the shoe, as set forth.

3. In combination with a truck, wheels mounted therein, swinging brake shoe carrying members mounted upon the truck, a brake shoe having an apertured shank portion extending through an opening in said member, a spring fastened to the truck and passing about the pivotal point in said swinging member and having a split end adapted to pass through an aperture in said shank portion of the brake shoe and tending to normally hold the brake shoe from contact with the wheels, as set forth.

In testimony whereof I hereunto affix my signature in the presence of two witnesses.

WILLIAM J. STAHR.

Witnesses:
A. L. HOUGH,
A. R. FOWLER.